United States Patent [19]

Kubota et al.

[11] 3,878,044

[45] Apr. 15, 1975

[54] METHOD OF PRODUCING L-ARGININE BY FERMENTATION

[75] Inventors: Koji Kubota, Kawasaki; Takiko Onoda, Tokyo; Hirotaka Kamijo, Kawasaki; Shinji Okumura, Tokyo, all of Japan

[73] Assignee: Ajinomoto Co., Inc., Tokyo, Japan

[22] Filed: Oct. 1, 1973

[21] Appl. No.: 402,020

[30] Foreign Application Priority Data

Oct. 9, 1972 Japan.............................. 47-101488

[52] U.S. Cl. ...................... 195/29; 195/49; 195/30
[51] Int. Cl............................................ C12d 13/06
[58] Field of Search.......................... 195/28, 29, 30

[56] References Cited

UNITED STATES PATENTS 3,222,258  12/1965  Iizuka et al. ......................... 195/29
3,440,141   4/1969  Douros et al. ........................ 195/28

*Primary Examiner*—Lionel M. Shapiro
*Assistant Examiner*—Robert J. Warden
*Attorney, Agent, or Firm*—Hans Berman; Kurt Kelman

[57]  ABSTRACT

An artificially induced mutant strain of Brevibacterium flavum which requires guanine for its growth and is capable of growth in a medium containing 10 mg/ml 2-thiazolalanine or other arginine analogs produces L-arginine in high yields from carbohydrates, acetate ions, or ethanol as carbon sources.

2 Claims, No Drawings

METHOD OF PRODUCING L-ARGININE BY FERMENTATION

This invention relates to the production of L-arginine (hereinafter referred to as "arginine"), and particularly to a method of producing arginine by fermentation.

Arginine is a known food ingredient and has found medical applications. It is known from U.S. Pat. Nos. 3,222,258 and 3,440,141 that small amounts of arginine are produced from hydrocarbons by certain wild strains of Corynebacterium and Brevibacterium. Higher concentrations of arginine have been produced from carbohydrates by mutant strains of *Brevibacterium flavum* and *Corynebacterium acetoacidophilum* by the method of British Patent No. 1,278,917. More recently, a mutant strain of *Bacillus subtilis* resistant to arginine hydroxamate has been reportet to produce a small amount of arginine (Applied Microbiology 22 [6] 987–991, 1971).

We now have found large amounts of arginine in generally conventional culture media on which guanine requiring mutant strains of Brevibacterium resistant to feedback inhibition and/or repression by arginine or arginine analogs had been cultured, and have recovered the arginine.

Mutant strains which differ from the parent by resisting feedback inhibition and/or repression by arginine or arginine analogs are readily obtained by exposing the parent strain to mutagenic agents and screening the treated microorganisms for their ability of growing on culture media containing arginine or arginine analogs in amounts of 5 mg/ml or more. Suitable arginine analogs include canavanine, homoarginine, α-methylarginine, 2-thienylserine, D-serine, ethionine, 2-thiazolalanine, α-amino-β-hydroxyvaleric acid, 6-chloropurine, and sulfa drugs such as sulfaguanidine, sulfamerazine, sulfisomezole, and sulfisoazole.

Mutants of Brevibacterium capable of growth of media containing the arginine analogs, such as *B. flavum* ATCC 21493, produce arginine to some extent even if they do not require specific organic nutrients. However, substantially enhanced arginine productivity is found in strains derived therefrom by further mutation and requiring guanine for their growth. The most effective arginine producing mutant of genus Brevibacterium found so far is the guanine requiring strain B. flavum AJ 3401 (FERM-P 1639) which is resistant to 2-thiazolalinine and canavanine. This microorganism has been deposited at the Fermentation Research Institute, Agency of Industrial Science and Technology, Ministry of International Trade and Industry, of Chiba-shi, Chiba-ken, Japan.

The following Examples illustrate the methods employed in obtaining microorganisms for use in the method of the invention, and the production of arginine by means of such microorganisms.

EXAMPLE 1

Cells of Brevibacterium flavum ATCC 14067 were exposed to mutagenic doses of X-rays and thereafter cultured in a complete agar flat plate at 31°C for 4 to 10 days. From the colonies appearing on the plate, a mutant strain No. 33038 requiring guanine was isolated by replica plating. It was treated with 250 μg/ml nitrosoguanidine at 30°C for 30 minutes, and the treated microorganism was inoculated on agar flat plates and cultured as above.

The medium of the last-mentioned plates contained 2% glucose, 0.3% urea, 1% $(NH_4)_2SO_4$, 0.1% $KH_2PO_4$, 0.04% $MgSO_4 \cdot 7H_2O$, 2 ppm $Fe^{++}$, 2 ppm $Mn^{++}$, 100 μg/l biotin, 200 μg/l thiamine hydrochloride, 0.015% guanine, 5 mg/ml 2-thiazolalanine, and 2% agar, and had a pH of 7.0.

Screening of the colonies appearing on the culture plates yielded strain No. 112 which produces L-histidine. The strain was further treated with nitrosoguanidine as above, and inoculated on agar plates differing in composition from the last-mentioned plates by containing 10 mg/ml 2-thiazolalanine.

All strains growing on the medium of higher thiazolalanine concentration resisted 2-thiazolalanine and the other arginine analogs enumerated above and were capable of producing arginine. The best arginine producer was the strain AJ 3401 which was isolated on the basis of its requirement for quanine and its resistance of canavanine.

It produces arginine in culture media containing at least one assimilable carbon source, at least one assimilable nitrogen source, and the usual inorganic ions and minor organic nutrients including guanine. Carbon sources suitable for all arginine producing strains of the invention include carbohydrates (glucose, sucrose, starch, starch hydrolyzate, molasses), organic acids (acetic acid, propionic acid, gluconic acid, succinic acid, citric acid, benzoic acid), and alcohols (ethanol), and some are capable of metabolizing n-alkanes. Suitable nitrogen sources include ammonium salts, nitrates, amino acids, urea, and ammonia. Aerobic fermentation with aeration and agitation produces good yields, and best yields require pH control between values of 5 and 9 which may be maintained in the usual manner by additions of ammonia, calcium carbonate, alkali metal hydroxide, urea, or inorganic or organic acids. At fermentation temperatures between 24° and 37°C, maximum arginine concentration is reached within 2 to 7 days.

The arginine concentration in the broth may be monitored colorimetrically according to the method of Voges-Proskauer.

EXAMPLE 2

20 ml Batches of an aqueous medium containing 10% glucose, 6% ammonium sulfate, 0.1% potassium dihydrogen phosphate, 0.04% magnesium sulfate heptahydrate, 2 ppm each of Fe and Mn ions, 50 μg/l biotin, 20 μg/l thiamine hydrochloride, 1% soy protein hydrolyzate (2.4% total nitrogen), 0.015% guanine were sterilized in respective 500 ml shaking flasks and adjusted to pH 7 with 5% separately sterilized calcium carbonate.

Inocula of B. flavum AJ 3401 prepared on bouillon agar slants were added to each flask which was thereafter held at 31°C with aeration and agitation for 72 hours. The combined broth contained 2.5 g/dl arginine and was centrifuged to remove the cells. One liter of the supernatant liquid was passed over a column packed with an ion exchange resin (Amberlite C-50, $NH_4$ type), and the arginine adsorbed by the resin was eluted with 2-N ammonium hydroxide solution. The eluate was partly evaporated to precipitate crude, crystalline arginine which, when dried, weighed 16.2 g.

EXAMPLE 3

B. flavum AJ 3401 was cultured 18 hours at 31°C with aeration and agitation on a seed culture medium containing 1% glucose, 0.3% ammonium acetate, 0.1% potassium dihydrogen phosphate, 0.04% magnesium sulfate heptahydrate, 2 ppm each of iron and manganese ions, 50 $\mu$g/l biotin, 200 $\mu$g/l thiamine hydrochloride, 1.5% soy protein hydrolyzate (containing 7% total nitrogen), and 0.015% guanine, at pH 7.0.

15 ml Inocula of the seed culture so obtained were transferred to sterile 300 ml batches of a fermentation medium in one liter glass jars. The fermentation medium contained 3% glucose, 0.5% ammonium acetate, 0.2% urea, 2% ammonium sulfate, 0.1% potassium dihydrogen phosphate, 0.04% magnesium sulfate heptahydrate 2 ppm each of iron and manganese ions, 50 $\mu$g/l biotin, 50 $\mu$g/l thiamine hydrochloride, 2.5% soy protein hydrolyzate (7% total nitrogen), and 0.015% guanine, pH 7.5.

The fermentation was carried out at 31° to 33°C for 55 hours, and the pH of the medium was held at 7.2 to 8.0 by adding a 60% acetic acid solution containing 0.25 mole ammonium acetate per mole of acetic acid. The cultured broth contained 3.03 g/dl L-arginine, and the amount of acetic acid consumed was 20% of the initial volume of the medium. Crystalline arginine was recovered from the broth as in Example 2 in an amount of 6.5 g per 300 ml batch.

EXAMPLE 4

A seed culture of *B. flavum* AJ 3401 was prepared on a medium containing 1.5% glucose, 0.3% urea, 0.1% $KH_2PO_4$, 0.04% $MgSO_4 \cdot 7H_2O$, 2 ppm $Fe^{++}$, 2 ppm $Mn^{++}$, 50 $\mu$g/l biotin, 200 $\mu$g/l thiamine hydrochloride, 1.5% soy protein hydrolyzate (7% total nitrogen), and 0.015% guanine, and having a pH of 7.5, at 31°C in 18 hours with aeration and agitation.

15 ml Inocula of the seed culture were transferred to 300 ml batches of a fermentation medium containing 1% glucose, 1% ethanol, 0.5% ammonium sulfate, 0.2% urea, 0.1% potassium dihydrogen phosphate, 0.04% magnesium sulfate heptahydrate, 2ppm $Fe^{++}$, 2 ppm $Mn^{++}$, 50 $\mu$g/l biotin, 50 $\mu$g/l thiamine hydrochloride, 2.5% soy protein hydrolyzate (7% total nitrogen) and 0.015% guanine, pH 7.5. The fermentation was carried out at 31° to 33°C with stirring while air was introduced at a rate of one volume per volume of culture medium per minute. A pH of 7.2 to 7.8 was maintained by means of gaseous ammonia. Residual ethanol in the culture medium was determined by gas chromatography, and the ethanol was replenished whenever it decreased to about 0.3%.

After 48 hours, the cultured broth contained 1.84 g/dl arginine, and the ethanol consumption was 16% based on the initial volume of the medium. 3.4 g Crystalline arginine was recovered from 300 ml of the culture broth as in Example 2.

What is claimed is:

1. A method of producing L-arginine which comprises:
   a. culturing *Brevibacterium flavum* FERM-P 1639 in an aqueous medium containing assimilable sources of carbon and nitrogen, inorganic salts, and minor organic nutrients necessary for the growth of said *Brevibacterium flavum* until arginine accumulates in said medium; and
   b. recovering the accumulated arginine.

2. A method as set forth in claim 1, wherein said assimilable source of carbon is at least one member of the group consisting of carbohydrate, acetate ions, and ethanol.

* * * * *